July 24, 1962 R. P. BROWN 3,046,485

BI-STABLE SWITCHING CIRCUIT WITH PULSE OVERLAP DISCRIMINATION

Filed April 25, 1958

INVENTOR
RICHARD P. BROWN
BY [signature]
AGENT

United States Patent Office 3,046,485
Patented July 24, 1962

3,046,485

BI-STABLE SWITCHING CIRCUIT WITH PULSE OVERLAP DISCRIMINATION

Richard P. Brown, Johnson City, N.Y., assignor to International Business Machines Corporation, New York, N.Y., a corporation of New York Filed Apr. 25, 1958, Ser. No. 731,002
2 Claims. (Cl. 328—195)

The invention relates to electronic switching circuits.

It is an object of the invention to provide improved switching means for a bi-stable device; for example, a latch; having extremely fast switching response characteristics during either turn on or turn off operations.

Another object of the invention resides in the provision of switching controls capable of responding to input pulses having a time duration of a half a microsecond or less.

Yet another object resides in the provision of improved latch control switch means conditioned by the state of the latch for effecting alternate switching of the latch in response to a succession of applied overlapping turn on and turn off signals.

Other objects of the invention will be pointed out in the following description and claims and illustrated in the accompanying drawings, which disclose, by way of examples, the principle of the invention and the best mode, which has been contemplated, of applying that principle.

Figure 1:
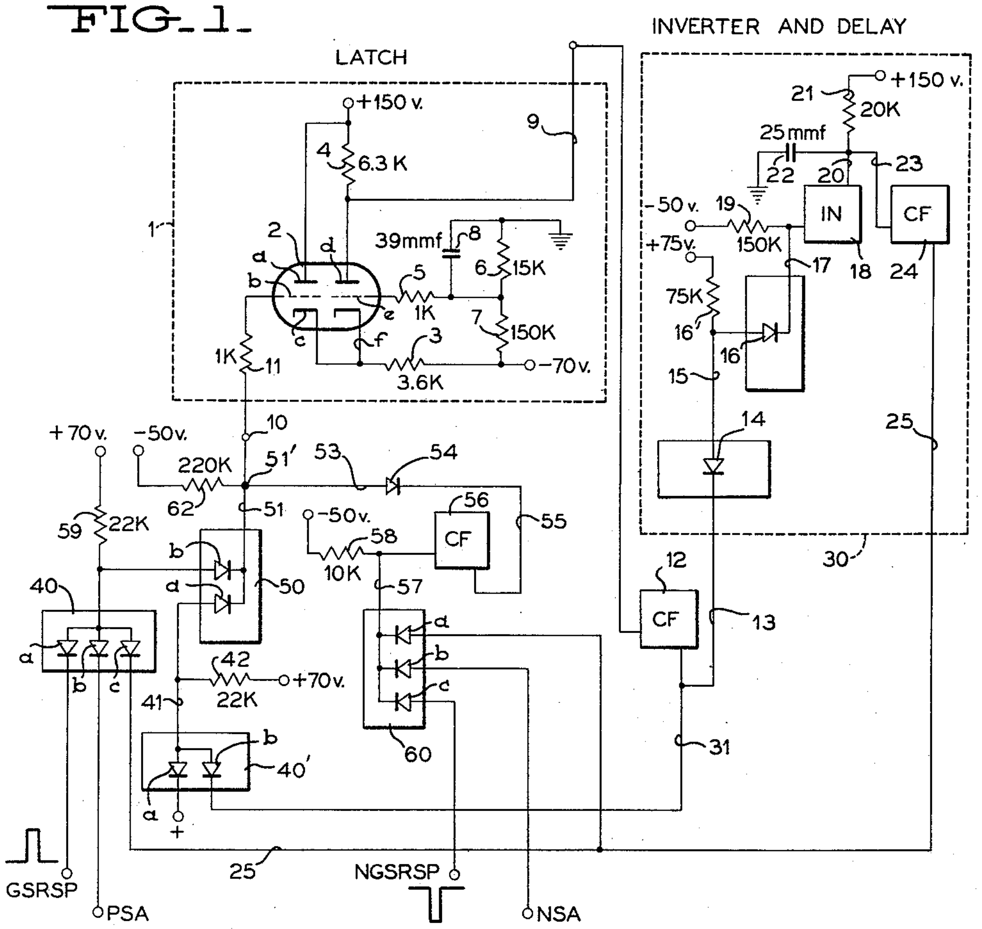
FIG. 1 is a detailed circuit diagram of a latch and related switching means.

Referring to FIG. 1, the bi-stable device comprises essentially electronic latch means 1, inverter and delay means 30, a feed back circuit, a latch back circuit, and appropriate means providing fast turn on and turn off operations of the latch. The electronic latch means 1 comprises a grounded grid amplifier 2 having plate sections 2$a$ and 2$d$, a pair of grids 2$b$ and 2$e$, and a pair of cathodes 2$c$ and 2$f$ connected in common to a resistor 3 in turn connected to a −70 volt supply. The plate section 2$a$ is tied directly to a +150 volt supply while the plate section 2$d$ is connected to this same supply by way of a path which includes a resistor 4. The grid 2$e$ is connected to an RC divider network which includes resistors 5, 6, and 7 and capacitor 8; the network being connected at one end to ground and at its opposite end to the −70 volt supply. The output of the latch 1 is taken along an output line 9, while inputs are applied to an input terminal 10 connected to the grid 2$b$ by way of a path which includes a grid resistor 11. The output line 9 is fed through a cathode follower 12 to a line 13 connected to the inverter and delay means 30.

The latter means 30 includes a diode unit 14 connected to a line 15 in turn connected to a +75 volt supply by way of a resistor 16'. The line 15 is fed to the input of an inverter 18 by way of a diode 16 and a line 17. The grid input of the inverter 18 is connected to a −50 volt supply by way of a resistor 19. The output of the inverter 18 is fed to an output line 20 connected to ground by way of a capacitor 22, and to a +150 volt supply by way of a resistor 21, and also to a line 23 connected to a cathode follower 24 whose output is passed along an output line 25. The capacitor 22 is used to slow down the rise time of the plate output along the line 20 when the inverter is cut off.

The diode unit 14 is used to provide a rise time delay of approximately one microsecond to the input to the inverter 18.

The feed back circuit includes the line 25, coincidence switch 40, mix 50, and line 51 connected to the input terminal 10. The latch means 1 output is fed along the line 9 through cathode follower 12, line 31, diode element $b$ of the switch 40', diode $a$ of mix 50, and through the line 51 connected to the input terminal 10. Diode $a$ of the switch 40' is connected to a positive source which is effective in a manner, not shown, to enable the switch 40' to be operable. The latch is further provided with a fast turn off circuit which includes line 53 connected to the terminal 10, diode 54, line 55, cathode follower 56, line 57, and the diode unit 60 having three diodes $a$, $b$, and $c$ connected respectively to the feed back line 25, a negative signal line (NSA) and a negative sampling signal line (NGSRSP).

The switch 40 has a connection to a positive 70 volt supply by way of a resistor 59. The switch 40 is referred to as a positive coincidence switch which provides a positive output in response to coincidence of positive signals applied to its inputs. It is seen that the resistance value of resistor element 62 of 220K resistance is 10 times the resistance value of resistor element 59 having 22K resistance. By virtue of this ratio, the latch is provided with a very fast pickup characteristic. Varying this ratio somewhat above or below that stated within reasonable limits will, of course, vary the response characteristic of the latch. The grounded grid amplifier has a relatively fast response and its output is in phase with the input.

The circuit described for obtaining a fast turn on of the latch device has one disadvantage in that it does not provide for a fast turn off of the latch. This disadvantage is due partly to the high resistance of resistor element 62 and partly to the inherent capacitance of the circuit. The fast turn off of the latch device is provided for by means of the path, previously explained, which includes the diode 54. This diode clamps down the point 51' to enable a fast discharge of the circuit capacitance in response to the application of a negative turn off signal applied to the cathode side of the diode 54.

In one aspect of the invention there are provided first and second control circuits respectively for switching on and off the latch means 1. The first control circuit includes the path extending between the PSA input terminal and the input terminal 10, and includes diodes 40$b$ and 50$b$ connected in series opposition and providing a junction therebetween to which the resistor 59 is connected, which resistor in turn is connected to the +70 volt supply. The circuit path further includes a junction 51' to which the resistor 62 is connected, the latter in turn being connected to the −50 volt supply. The diodes may be any form of unidirectional impedance devices or asymmetrically conducting means having pronounced characteristics. The second control circuit extends between the NSA terminal and the terminal 10, and includes the unidirectional means 54 and 60$b$ connected in series opposition and providing a junction therebetween, disregarding for the moment the cathode follower 56, to which the resistor 58 is connected. Of significance in the first control circuit is the ratio of resistance of the elements 62 and 59. The raio of 10 in this instance provides for optimum switching during turning on operations.

Figure 2:
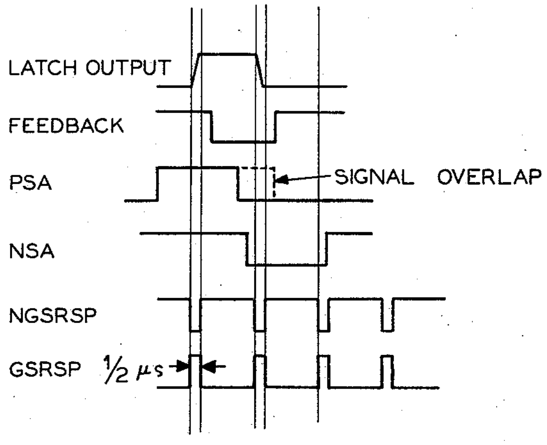
FIG. 2 is a time chart showing the timing characteristics of the various signals including input turn on and turn off signals and sampling, or gating, signals.

In another aspect of the invention means are adapted to switch the latch from an existing state to a reverse state in response to applied overlapping control signals under control of the switches 40 and 60. The switch 40 is controlled by positive input signals, and the switch 60 is controlled by negative input signals. Both switches 40 and 60, however, are also connected to the feed back line 25. To facilitate explaining the operation of the latch, it may be appropriate at this point to refer to the time chart of FIG. 2 for the purpose of observing the various time relationships, particularly the positive and negative control signals PSA and NSA, as well as the sampling signals GRSP and NGRSP. Under normal conditions of operation, the NSA and PSA signals do not overlap. However, in the event of an overlap condition, as shown by the dotted portions on the waveform representing the PSA signal and pointed to by the arrow labeled Signal Overlap, the control circuits are particularly effective to control the alternate switching of the latch.

To explain the operation of the bi-stable latch, it will be assumed that the latch means 1 is in its off state; accordingly, the signal output on the line 9 is at a down level. This down level is then passed through the inverter and delay means 30 and emerges therefrom as a delayed positive signal along the feed back line 25. This positive delayed signal is applied concurrently to both the switches 40 and 60 by way of the line 25. Now then, upon application of the positive signal PSA and the positive sampling signal GSRSP, the switch 40 is rendered effective to apply a half microsecond signal through the diode 50*b* to the input terminal 10 to turn on the grounded grid amplifier 2 to a conduction state. As a result, the signal output on the line 9 is switched to an up level and passed on through the cathode follower 12 to the lines 13 and 31. The line 13 passes the up level signal through the inverter and delay means 30 from where it emerges as a delayed down, or negative, signal that is applied over the feed back line 25 to both the switches 40 and 60. The line 31 passes the up, or positive, level signal through the latch back path which includes the *b* diode of switch 40′, the *a* diode of which is also positive. Accordingly, the switch 40′ provides a positive output through line 41, diode 50*a*, and line 51 to the input terminal 10 to hold on the latch. Upon application of the control signals PSA and NSA, alternate operations of the latch will be maintained under control of the feed back circuit arrangement including the positive switch 40 and the negative switch 60. One of the important aspects of the latch circuit is the phase relationship between the latch output and the feed back. This relationship may be observed from a comparison of the appropriate waveforms, shown in FIG. 2. Here in FIG. 2 it is noted that, during the sampling interval of one-half microsecond, the feed back response is delayed for a short period until after the termination of the sampling pulse interval while the latch output is effective during the sampling interval. The phase relationship is substantially the same for both turn on and turn off operations of the latch. Since the switches 40 and 60 are conditioned by the inverted condition, or state, of the latch, the application of a positive control signal to the switch 40 and a negative signal to the switch 60, will cause alternate operations in spite of control signals overlap.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A switching arrangement comprising: a source of first and second alternately timed control signals which may overlap, a bi-stable device having a first and a second condition of stability and provided with an input and an output terminal, a first and a second coincidence switching means connected to said input, a latch back circuit connected intermediate said output and said input and operable to latch said device into either condition of stability depending upon the condition of said device, delay means connected to said output and responsive to the condition of said device to issue an appropriate delayed first or second condition signal, said delay means delaying the issuance of the appropriate delayed signal until after the device has been latched, means applying the delayed signal and said control signals to both the coincidence switching means, and gating means for applying to the first and second switching means appropriate first and second gating signals to render the switching means alternately operative to switch said device alternately.

2. A switching arrangement comprising: a source of alternately timed positive and negative control signals which may overlap; a bi-stable device having a first and a second condition of stability and adapted with an input and an output terminal; a positive and a negative coincidence switching means connected to said input; a latch back circuit connetced intermediate said output and said input to issue the latter an appropriate latch back condition signal, indicative of the condition of said device, to latch the device; delay means connected to said output and responsive to the conditions of said latch device to issue an appropriate delayed positive or negative signal, said delay means delaying the issuance of the appropriate delayed signal until after the issuance of the latch back condition signal; means applying the delayed signal and said control signals to both the positive and negative coincidence switching means; and gating means for applying to the positive and negative coincidence switching means appropriate positive and negative gating signals to render the switching means alternately operative to switch said latch device alternately.

References Cited in the file of this patent

UNITED STATES PATENTS

| | | |
|---|---|---|
| 2,628,309 | Hughes | Feb. 10, 1953 |
| 2,785,859 | Steinberg | Mar. 19, 1957 |
| 2,790,900 | Feissel | Apr. 30, 1957 |
| 2,830,179 | Stenning | Apr. 8, 1958 |
| 2,835,801 | Haueter | May 20, 1958 |
| 2,870,347 | Jensen | Jan. 20, 1959 |
| 2,901,605 | Raymond et al. | Aug. 25, 1959 |

OTHER REFERENCES

"Transistor Electronics," Lo et al., Prentice-Hall, Inc., 1955, page 472.